US010885593B2

(12) United States Patent
Yang et al.

(10) Patent No.: US 10,885,593 B2
(45) Date of Patent: Jan. 5, 2021

(54) HYBRID CLASSIFICATION SYSTEM

(71) Applicant: Microsoft Technology Licensing, LLC, Redmond, WA (US)

(72) Inventors: Fan Yang, Redwood City, CA (US); Craig Martell, San Juan Bautista, CA (US); Dan Shacham, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 630 days.

(21) Appl. No.: 14/735,022

(22) Filed: Jun. 9, 2015

(65) Prior Publication Data

US 2016/0364810 A1 Dec. 15, 2016

(51) Int. Cl.
*G06Q 50/00* (2012.01)
*G06N 20/00* (2019.01)
*G06Q 30/02* (2012.01)

(52) U.S. Cl.
CPC ............. *G06Q 50/01* (2013.01); *G06N 20/00* (2019.01); *G06Q 30/02* (2013.01)

(58) Field of Classification Search
CPC ......... G06N 20/00; G06Q 30/02; G06Q 50/01
USPC .......... 705/319; 704/260; 382/224; 707/737, 707/749
See application file for complete search history.

(56) References Cited

U.S. PATENT DOCUMENTS

| | | | |
|---|---|---|---|
| 6,278,969 B1 * | 8/2001 | King ....................... G06F 40/47 704/7 |
| 7,295,963 B2 * | 11/2007 | Richardson ............. G06F 40/47 704/2 |
| 7,349,917 B2 * | 3/2008 | Forman ................... G06F 16/35 |
| 7,480,667 B2 * | 1/2009 | Harr ........................ G06F 16/35 |
| 7,894,677 B2 * | 2/2011 | Konig ................... G06K 9/6282 382/128 |
| 8,412,512 B1 * | 4/2013 | Wren ................ G06F 17/30861 704/2 |
| 8,510,307 B1 * | 8/2013 | Touloumtzis ..... G06F 17/30707 707/740 |
| 8,572,013 B1 * | 10/2013 | Nash ................. G06F 17/30722 706/20 |
| 8,583,416 B2 * | 11/2013 | Huang ................ G10L 15/1822 704/251 |

(Continued)

OTHER PUBLICATIONS

EIC 3600 Search Report (Year: 2019).*

(Continued)

*Primary Examiner* — Andrew B Whitaker
*Assistant Examiner* — Johnathan J Lindsey, III
(74) *Attorney, Agent, or Firm* — Schwegman Lundberg & Woessner, P.A.

(57) ABSTRACT

Hybrid classification system and method are described. The method commences when an input detector detects a raw input string that represents a value of a category in a member profile maintained by the on-line social network. The machine learning classifier derives a standardized value corresponding to the raw input string. The trigger module provides the raw input string to the correcting filter. The correcting filter determines a corrected standardized value corresponding to the raw input string based on the raw input string and a corrective rule. The label module then identifies the member profile as associate with the corrected standardized value.

18 Claims, 5 Drawing Sheets

(56) References Cited

U.S. PATENT DOCUMENTS

| | | | | |
|---|---|---|---|---|
| 8,751,424 B1* | 6/2014 | Wojcik | ............ | G06F 21/554 |
| | | | | 706/20 |
| 9,122,674 B1* | 9/2015 | Wong | ............ | G06F 17/28 |
| 9,342,592 B2* | 5/2016 | Giverts | ............ | G06F 16/90344 |
| 9,792,359 B2* | 10/2017 | Kirshenbaum | ............ | G06F 16/35 |
| 9,881,037 B2* | 1/2018 | Giverts | ............ | G06F 16/355 |
| 2002/0156816 A1* | 10/2002 | Kantrowitz | ............ | G06F 40/253 |
| | | | | 715/256 |
| 2004/0059697 A1* | 3/2004 | Forman | ............ | G06K 9/6228 |
| | | | | 706/46 |
| 2004/0064464 A1* | 4/2004 | Forman | ............ | G06F 17/30705 |
| 2011/0238591 A1* | 9/2011 | Kerr | ............ | G06Q 10/1053 |
| | | | | 705/321 |
| 2012/0053946 A1* | 3/2012 | Bellegarda | ............ | G10L 13/02 |
| | | | | 704/260 |
| 2012/0166183 A1* | 6/2012 | Suendermann | ... | G06F 17/30654 |
| | | | | 704/9 |
| 2013/0073557 A1* | 3/2013 | Nezhad | ............ | G06F 16/285 |
| | | | | 707/741 |
| 2013/0073558 A1* | 3/2013 | Bangel | ............ | G06F 16/313 |
| | | | | 707/741 |
| 2014/0149206 A1* | 5/2014 | Dubey | ............ | G06Q 30/0269 |
| | | | | 705/14.45 |
| 2014/0207716 A1* | 7/2014 | Hsu | ............ | G06N 99/005 |
| | | | | 706/12 |
| 2014/0281944 A1* | 9/2014 | Winer | ............ | G06F 40/242 |
| | | | | 715/259 |
| 2014/0291944 A1* | 10/2014 | Kogure | ............ | B60G 3/20 |
| | | | | 280/5.522 |
| 2014/0324435 A1* | 10/2014 | Bellegarda | ............ | G10L 13/10 |
| | | | | 704/260 |
| 2014/0379616 A1* | 12/2014 | Sun | ............ | G06Q 10/101 |
| | | | | 706/11 |
| 2015/0039406 A1* | 2/2015 | Dubey | ............ | G06Q 30/0242 |
| | | | | 705/14.4 |
| 2015/0081279 A1* | 3/2015 | Suleman | ............ | G06F 17/27 |
| | | | | 704/9 |
| 2016/0307278 A1* | 10/2016 | Lipka | ............ | G06Q 50/01 |

OTHER PUBLICATIONS

Programiz ("C++ If, If . . . Else, and Nested If . . . Else" (Mar. 15, 2014), https://www.programiz.com/cpp-programming/if-else) (Year: 2014).*

Cheusheva, "Using IF Function in Excel: Formulas for Numbers, Text, Dates, Blank Cells" (Mar. 16, 2015), https://www.ablebits.com/office-addins-blog/2014/11/26/if-function-excel/. (Year: 2015).*

14735022 NPL—EIC 3600 Search Report 061820 (Year: 2020).*

14735022 NPL—EIC 3600 Search Report 071919 (Year: 2019).*

"International Application Serial No. PCT/US2015/038694, International Search Report dated Oct. 2, 2015", 3 pgs.

"International Application Serial No. PCT/US2015/038694, Written Opinion dated Oct. 2, 2015", 6 pgs.

* cited by examiner

HYBRID CLASSIFICATION SYSTEM

TECHNICAL FIELD

This application relates to the technical fields of software and/or hardware technology and, in one example embodiment, to hybrid classification system.

BACKGROUND

An on-line social network may be viewed as a platform to connect people in virtual space. An on-line social network may be a web-based platform, such as, e.g., a social networking web site, and may be accessed by a use via a web browser or via a mobile application provided on a mobile phone, a tablet, etc. An on-line social network may be a business-focused social network that is designed specifically for the business community, where registered members establish and document networks of people they know and trust professionally. Each registered member may be represented by a member profile. A member profile may be represented by one or more web pages, or a structured representation of the member's information in XML (Extensible Markup Language), JSON (JavaScript Object Notation) or similar format. A member's profile web page of a social networking web site may emphasize current employment, employment history, and education of the associated member. Professional titles and other user-provided information that appear in member profiles is not always descriptive enough to permit accurate classification of said information into the standardized taxonomy, which may be used, e.g., to ascertain whether a certain job posting would be appropriate for presentation to a particular member of the on-line social networking system.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
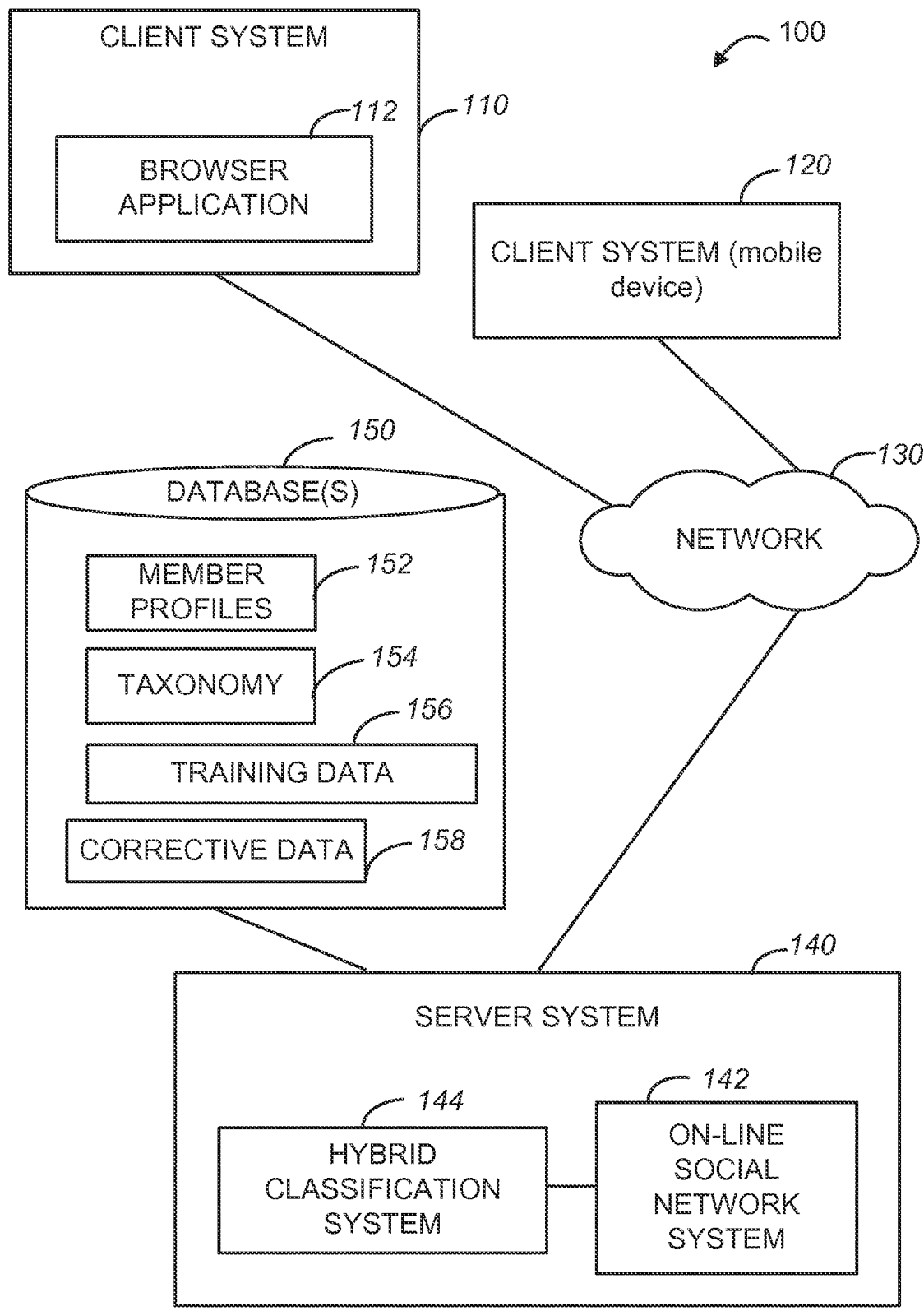
FIG. 1 is a diagrammatic representation of a network environment within which an example hybrid classification system may be implemented.

A hybrid classification system is described, that may be utilized beneficially in the context of an on-line social network system. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method describe herein and is considered as being within a scope of the present invention.

For the purposes of this description the phrases "an on-line social networking application" and "an on-line social network system" may be referred to as and used interchangeably with the phrase "an on-line social network" or merely "a social network." It will also be noted that an on-line social network may be any type of an on-line social network, such as, e.g., a professional network, an interest-based network, or any on-line networking system that permits users to join as registered members. For the purposes of this description, registered members of an on-line social network may be referred to as simply members.

Each member of an on-line social network is represented by a member profile (also referred to as a profile of a member or simply a profile). A member profile may be associated with social links that indicate the member's connection to other members of the social network. A member profile may also include or be associated with comments or recommendations from other members of the on-line social network, with links to other network resources, such as, e.g., publications, etc. As mentioned above, an on-line social networking system may be designed to allow registered members to establish and document networks of people they know and trust professionally. Any two members of a social network may indicate their mutual willingness to be "connected" in the context of the social network, in that they can view each other's profiles, profile recommendations and endorsements for each other and otherwise be in touch via the social network. Members that are connected in this way to a particular member may be referred to as that particular member's connections or as that particular member's network.

The profile information of a social network member may include various information such as, e.g., the name of the member, current and previous geographic location of the member, current and previous employment information of the member, information related to education of the member, information about professional accomplishments of the member, publications, patents, etc. The profile information of a social network member may also include information about the member's professional skills. Information about a member's professional skills may be referred to as professional attributes. Professional attributes may be maintained in the on-line social network system and may be used in the member profiles to describe and/or highlight professional background of a member. Some examples of professional attributes (also referred to as merely attributes, for the purposes of this description are strings representing professional skills that may be possessed by a member (e.g., "product management," "patent prosecution," "image processing," etc.). Thus, a member profile may indicate that the member represented by the profile is holding himself out as possessing certain skills. A member profile may also indicate that one or more skills of the member have been endorsed by other members of the on-line social networking system. The information in a member profile indicating that certain skills have been endorsed by one or more other members, may be termed endorsed skills or endorsements. Endorsements may be with respect to skills that are included in the member profile, and also with respect to skills that are not included in the member profile. Both skills and endorsements may be considered to be professional attributes, for the purposes of this description.

Thus, an on-line social network system may store a great number of raw input strings representing a specific category of information, such as, e.g., a professional occupation or title, a company, a school, etc. A raw input string representing a value of a category in a member profile may not always be readily discernable. For example, while a member may use strings such as "a patent attorney" or "a software engineer" to represent their title, another member may use an input string such as "a data ninja" or "a decider," which would make these less conventional titles more difficult to use tier certain purposes, such as matching a member with a suitable job listing. In order to effectively use the information represented by the raw input strings that are typically entered by a member, the on-line social network system may be configured to classify raw input strings from certain one or more designated fields in the member profiles into respective standardized taxonomies.

Classifying any given input string into the standardized taxonomy is a challenging entity resolution problem. One approach to classification is rule-based. Another approach is statistical modeling that utilizes machine learning. The rule-based approach may become hard to manage as the number rules increases, while the machine learning or model-based approach may require a relatively long period of time to accumulate enough training data for updating the model.

Hybrid classification method and system are provided that combine advantages of both the rule-based classification and the statistical modeling by using a secondary rule-based classifier that is sensitive to real-time data updates in addition to the main model-based classifier. The additional classifier may include a collection of rules aimed at correcting at least some of potentially defective output produced by the main model-based classifier. This secondary rule-based classifier may be referred to as a correcting filter.

The main classifier may be a machine learning tool that is trained using training data, e.g., using a regression analysis—a statistical process for estimating the relationships among variables. The trained main classifier may be used to analyze a raw input string and output a standardized entity from the taxonomy that represents the raw input string. For example, with respect to information representing members' professional titles in an on-line social network system, a main classifier for classifying raw title strings—the main title classifier—may be trained using pre-prepared training data, e.g., in the form of member profiles with their respective raw title strings and the corresponding standardized title strings In one embodiment, the training data consists of a set of training examples. Each example is a pair consisting of an input record (typically a vector) and a desired output label. For any given input raw entity string, similar standard entities are located as candidates, and then the output is labeled as "1" if the candidate entity is correct, and as "−1" if otherwise. After obtaining the training data, a machine learning algorithm analyzes the training data and produces an inferred function, which can be used for predicting the output label for new examples. Once trained, the main title classifier may take a member profile including a raw title string as input and produce, as an output, a standardized entity. For the purposes of this description, a standardized entity may also be referred to as a standardized value. In some embodiments, the main title classifier may determine one or more standardized entities with their corresponding confidence values indicating the likelihood of that standardized entity accurately representing the raw input title and select, as final output, the standardized entity having the highest confidence value.

As more training data becomes available, the main classifier may be trained further, which may increase the accuracy of its ensuing output. However, the process of retraining or continuously training a classifier may not always result in a timely change to a certain trend in raw data. For example, a continuously trained main title classifier utilized by an on-line social network may not react in a timely manner to a new trend in professional titles, where, e.g., a professional position that has been traditionally represented by the title "software engineer" is more and more often represented by the title "data scientist." If the trend continues, the main title classifier would eventually be sufficiently trained to recognize that certain raw title strings in member profiles should be classified as "data scientist," as opposed to "software engineer," At the beginning of such change in title trend, the main title classifier would return the classified title "software engineer" to represent a raw title that includes the phrase "data scientist," even when members start indicating, e.g., through calls to tech support, that they do not wish to have their input of "data scientist" string into the title field in their profile to be associated with the standardized entity "software engineer."

A rules-based additional classifier—the correcting filter mentioned above—may be used beneficially to address a delayed reaction of a main machine teaming—based classifier to small amounts of new additional training data and to correct at least some known mistakes made by the main classifier in producing its output. In one example embodiment, the correcting filter may be configured to take, as input, a raw string processed by the main classifier and the associated member profile identification, determine whether any of the rules maintained by the correcting classifier are applicable, and, if so, produce a corrected standardized entity. This corrected standardized entity, if different from the standardized entity produced by the main classifier, may be used by the on-line social network system instead of the standardized entity produced by the main classifier.

In operation, the hybrid classification system obtains additional, corrective, training data that can be collected using information received via technical support calls that provide concrete information regarding misclassified raw input strings, via specialized tools permitting users to view the results produced by the main classifier with respect to the users' input into various data fields in their member profiles, as well as via one or more crowd sourcing techniques. This additional corrective training data is used to generate so-called correction rules to be utilized by the correcting filter.

In one embodiment, in the context of an on-line social network, some members may be permitted access to a viewer tool such that they can see how their various raw input was classified by respective machine learning-based classifiers and to submit corrections if the resulting standardized entity does not accurately represent their raw input. A submitted correction, together with the information from the associated profile is processed by the hybrid classification system to create a rule. For example, a member may access the viewer tool and discover that their raw input indicating that their professional title is "data scientist" was classified as "software engineer." The member, being aware that "data scientist" is indeed the title used by their company, may submit a correction. In response, the hybrid classification system may create a rule instructing the correcting filter to associate that particular member profile with the standardized entity "data scientist" if the raw input string representing the professional title of the associated member includes the phrase "data scientist." The hybrid classification system may create other rules based on the obtained correction, such as a rule that may instruct the correcting filter to detect a raw input string representing the professional title of the associated member that includes the phrase "data scientist," analyze the associated member profile and, based on the result of the analysis, assign the standardized title "data scientist" to that associated member profile. The hybrid classification system may also be configured to determine whether a standardized entity produced by a particular correction rule is always or almost always the same as the result produced by the main classifier with respect to the same raw input string and, if so, conclude that the main classifier has been sufficiently trained with respect to that particular rule, and remove that rule from the correcting filter.

It will be noted that while the hybrid classification method and system is being described in the context of an on-line social network system, this hybrid approach may be used beneficially in a variety of other applications that involve classification of input strings. An example hybrid classification system may be implemented in the context of a network environment 100 illustrated in FIG. 1.

As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line social network system 142. As explained above, each member of an on-line social network is represented by a member profile that contains personal and professional information about the member and that may be associated with social links that indicate the member's connection to other member profiles in the on-line social network. Member profiles and related information may be stored in a database 150 as member profiles 152.

The client systems 110 and 120 may be capable of accessing the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a hybrid classification system 144. The hybrid classification system 144 may be configured to combine advantages of both the rule-based classification and the statistical modeling by using a secondary rule-based classifier that is sensitive to real-time data updates in addition to the main model-based classifier. As explained above, the additional classifier, referred to as a correcting filter in this description, may include a collection of rules aimed at correcting at least some of potentially defective output produced by the main model-based classifier. The hybrid classification system 144 may include or have access to taxonomy 154 that stores standardized values of respective categories of information present in the member profiles 152, and may include or have access to training data 156 that is used to train the machine learning (model-based) classifier, also referred to as a machine-learning model, and may also include or have access to corrective data 158.

Figure 2:
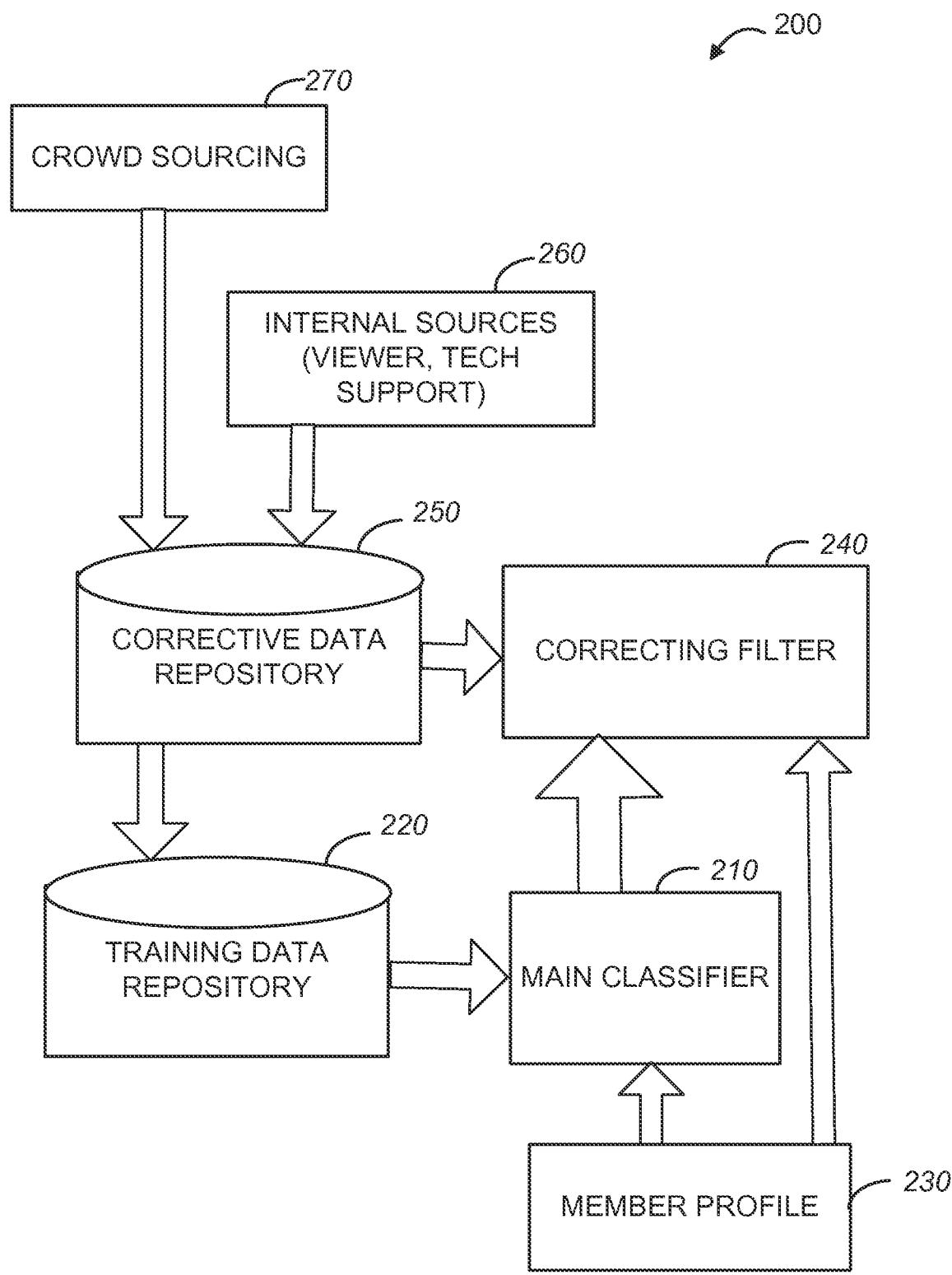
FIG. 2 illustrates an architecture of a hybrid classification system, in accordance with one example embodiment.

Example architecture 200 that uses both the machine-learning model and a rule-based classifier is illustrated in FIG. 2. As shown in FIG. 2, the architecture 200 includes a main classifier 210, which is also referred to as a machine learning classifier or a machine-learning model. The main classifier 210 is trained using training data from a training data repository 220. In one embodiment, the training data consists of a set of training examples. Each example is a pair consisting of an input record (typically a vector) and a desired output label. For any given input raw entity string, similar standard entities are located as candidates, and then the output is labeled as "1" if the candidate entity is correct, and as "−1" if otherwise. After obtaining the training data, a machine learning algorithm analyzes the training data and produces an inferred function, which can be used for predicting the output label for new examples. When the main classifier 210 receives, as input, data from an input member profile 230 maintained by the on-line social network 142 of FIG. 1, such as a raw input string that represents a value of a category in member profiles, the main classifier 210 derives a standardized value corresponding to the raw input string. The derived standardized value may be from the taxonomy 154 of FIG. 1.

The raw input string, together with the identification of the member profile 230, is provided as input to a correcting filter 240. The correcting filter 240 is a rule-based classifier configured to derive respective standardized values with respect to raw input strings based on one or more applicable rules. The rules utilized by the correcting classifier 240 are generated based on corrective data stored in a corrective data repository 250. As explained above, corrective data may be obtained from internal sources 260, e.g., based on data received from users of the on-line social network 142 via technical support channels or by inviting certain members to examine the standardized values assigned to their respective member profiles by the main classifier 210. The standardized values assigned to respective member profiles by the main classifier 210 may be examined by accessing a specialized viewer tool that displays results of classification process that may not be available to general population of members of the on-line social network 142. Corrective data may also be obtained using crowd sourcing 270. The correcting filter 240, together with one or more of other components illustrated in FIG. 2 may be referred to as a hybrid classification system and, in some embodiments, corresponds to the hybrid classification system 144 of FIG. 1. An example hybrid classification system 300 is illustrated in FIG. 3.

Figure 3:
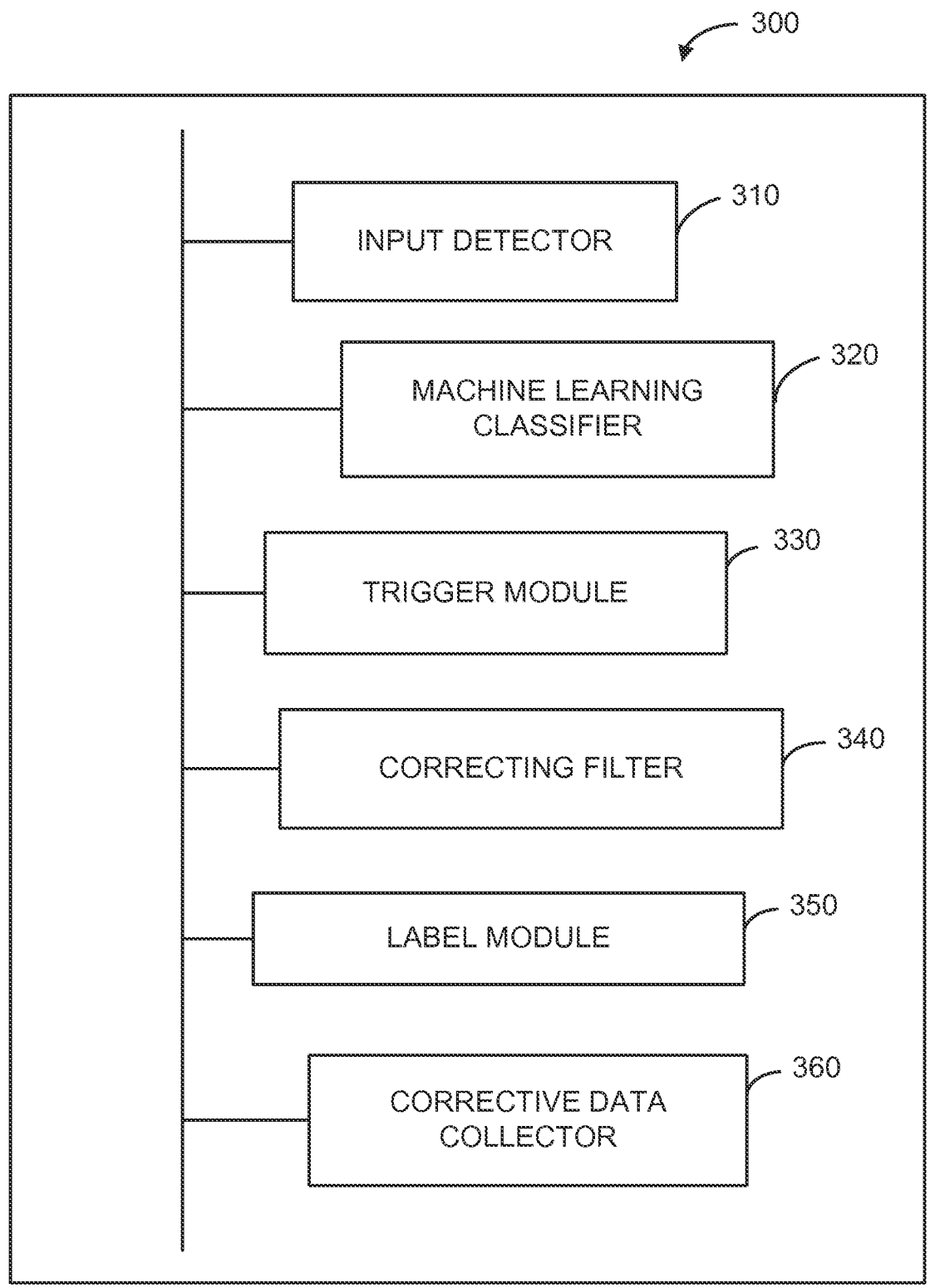
FIG. 3 is a block diagram of a hybrid classification system, in accordance with one example embodiment.

FIG. 3 is a block diagram of a hybrid classification system 300. As shown in FIG. 3, the system 300 includes an input detector 310, a machine learning classifier 320, a trigger module 330, a correcting filter 340, and a label module 350. The input detector 310 may be configured to detect a raw input string that represents a value of a category in a member profile maintained by the on-line social network 142 of FIG. 11. A category may be, e.g., a professional title, a company, or a school. The machine learning classifier 320 may be configured to derive a standardized value corresponding to the raw input string. The machine learning classifier 320 corresponds to the main classifier 210 of FIG. 2. The trigger module 330 may be configured to provide the raw input string to a correcting filter. The correcting filter 340 may be configured to determine a corrected standardized value corresponding to the raw input string based on the raw input string and a corrective rule. The label module 350 may be configured to identify the member profile as associate with the corrected standardized value.

The correcting filter 340 corresponds to the correcting filter 240 of FIG. 2. The corrective rules are generated by the correcting filter 340 based on the corrective data 158 of FIG. 1 (which, in some embodiments, corresponds to data stored in the corrective data repository 250 of FIG. 2). One example of a corrective rule may be the following format: <memberID, input string, classified entity, suggested entity>, where memberID is the identification of a member profile that includes the raw input string, input string is the raw input string, classified entity is a standardized value corresponding to the raw input string produced by the machine learning classifier 320, and the suggested entity is the output from the correcting filter 340. Another example of a corrective rule is a rule that references one or more professional attributes (e.g., skills, and endorsements listed in respective member profiles) maintained by the on-line social network system 142.

Also shown in FIG. 3 is a corrective data collector 360. The corrective data collector 360 may be configured to collect corrective data using, e.g., internal sources and/or crowd sourcing techniques, as explained above. The corrective data that is used for generating corrective rules utilized by the correcting fitter 340 may be accessed, e.g., from the corrective data repository 250 of FIG. 2.

The correcting filter 340 may be further configured to eliminate certain corrective rules if it is determined that those rules produce, with a certain frequency, the same result as the machine learning classifier 320. For example, the correcting filter 340 may determine that the corrected standardized value produced using a particular corrective rule is the same as the standardized value produced by the machine learning classifier 320 and, in response, remove that corrective rule from a set of rules used by the correcting filter 340. Still further, the correcting filter 340 may be configured to determine corrected standardized values in response to a potential error indicator. A potential error indicator may be determined based on a result of comparing the raw input string with a string included in the corrective rule. For example, the correcting filter 340 may be invoked only if it is determined that the raw input string includes a particular word or phrase. Or, for example, if it is determined that the raw input string is associated with a member profile represented by a particular member identification.

Figure 4:
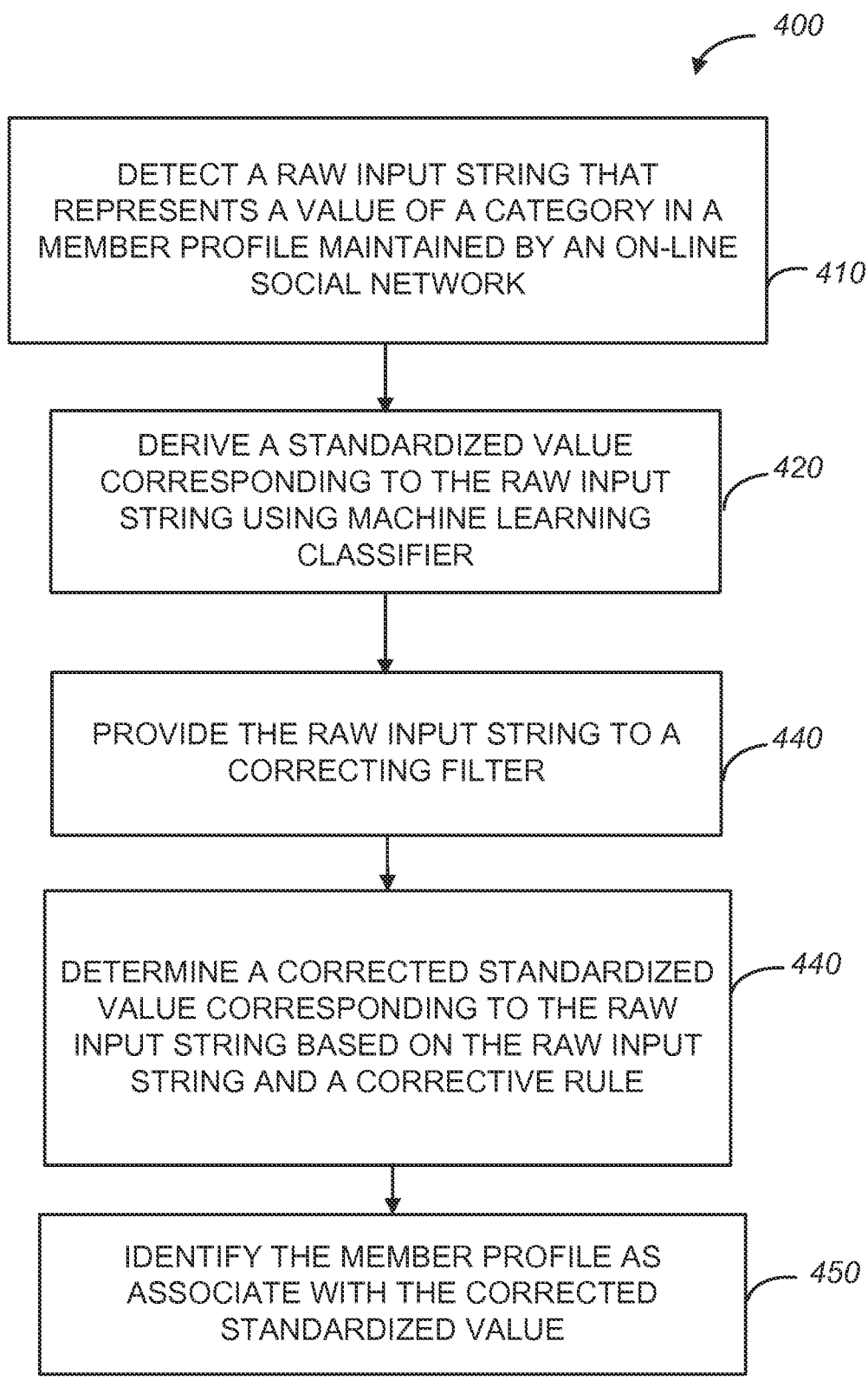
FIG. 4 is a flow chart illustrating a method utilizing a hybrid classification system, in accordance with an example embodiment.

Some operations performed by the system 300 may be describe with reference to FIG. 4. FIG. 4 is a flow chart of a method 400 to produce hybrid classification system for a member in an on-line social network system 142 of FIG. 1. The method 400 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 300 shown in FIG. 3.

As shown in FIG. 4, the method 400 commences at operation 410, when the input detector 310 detects a raw input string that represents a value of a category in a member profile maintained by the on-line social network 142 of FIG. 1. At operation 420, the machine learning classifier 320 derives a standardized value corresponding to the raw input string. The trigger module 330 provides the raw input string to the correcting filter 340 at operation 430. The correcting filter 340 determines a corrected standardized value corresponding to the raw input string based on the raw input string and a corrective rule, at operation 440. At operation 450, the label module 350 identifies the member profile as associate with the corrected standardized value.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Figure 5:
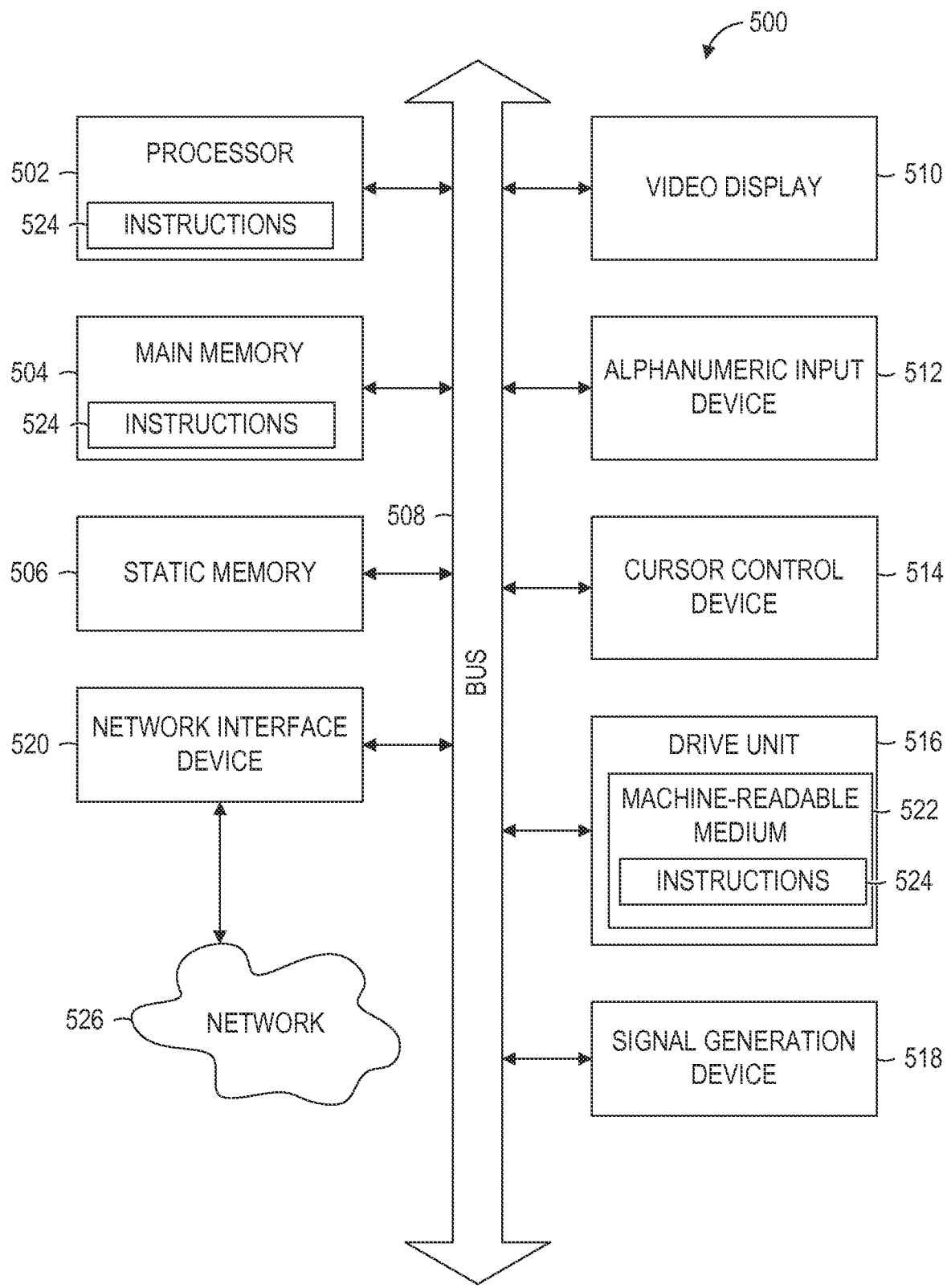
FIG. 5 is a diagrammatic representation of an example machine in the form of a computer system within which a set of instructions, for causing the machine to perform any one or more of the methodologies discussed herein, may be executed.

FIG. 5 is a diagrammatic representation of a machine in the example form of a computer system 500 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 505. The computer system 500 may further include a video display unit 510 (e.g., a liquid crystal display (LCD) or a cathode ray tube (CRT)). The computer system 500 also includes an alpha-numeric input device 512 (e.g., a keyboard), a user interface (UI) navigation device 514 (e.g., a cursor control device), a disk drive unit 516, a signal generation device 518 (e.g., a speaker) and a network interface device 520.

The disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, with the main memory 504 and the processor 502 also constituting machine-readable media.

The software 524 may further be transmitted or received over a network 526 via the network interface device 520 utilizing any one of a number of well-known transfer protocols (e.g., Hyper Text Transfer Protocol (HTTP)).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

MODULES, COMPONENTS AND LOGIC

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, a hybrid classification system has been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense,

The invention claimed is:

1. A computer-implemented method comprising:
    detecting a raw input string for a category in a member profile maintained by an on-line network for a first member, the category having a plurality of predefined standardized values;
    executing a machine-learning classifier to select one of the predefined standardized values corresponding to the raw input string, the machine-learning classifier being obtained by training a machine-learning tool that estimates relationships among variables, the training using training data having raw strings and corresponding standardized values for the raw strings;
    displaying the selected standardized value to the first member;
    from the first member, receiving a correction for the selected standardized value, the correction including a corrected standardized value from the plurality of predefined standardized values;
    including into a correcting filter the received correction as a corrective rule that matches the raw input string for the category to the corrected standardized value for the category;
    receiving the raw input string from a second member of the on-line network;
    executing the machine-learning classifier based on the received raw input string from the second member;
    providing the received raw input string to the correcting filter to obtain, based on the raw input string and the corrective rule, the corrected standardized value corresponding to the raw input string, using at least one processor;
    determining that the standardized value that was derived by the executing of the machine-learning classifier is different from the corrected standardized value obtained by the correcting filter; and
    identifying a member profile of the second member as associated with the corrected standardized value in response to determining that the standardized value that was derived by the executing of the machine-learning classifier is different from the corrected standardized value obtained by the correcting filter.

2. The method of claim 1, wherein the corrective rule includes an identification of the member profile.

3. The method of claim 1, wherein the corrective rule references one or more professional attributes maintained by the on-line network.

4. The method of claim 1, comprising:
    determining that the corrected standardized value is the same as the standardized value obtained by the machine-learning classifier; and
    removing the corrective rule from a set of rules used by the correcting filter in response to the determining.

5. The method of claim 1, comprising:
    obtaining corrective data; and
    generating the corrective rule based on the corrective data.

6. The method of claim 5, comprising:
    adding the corrective data to the training data used for re-training of the machine-learning classifier.

7. The method of claim 1, comprising determining the corrected standardized value in response to a potential error indicator.

8. The method of claim 7, wherein the potential error indicator is an identification of the member profile.

9. The method of claim 1, wherein the category represents one of a professional title, a company, or a school.

10. A computer-implemented system comprising one or more processors and a non-transitory computer readable storage medium comprising instructions that when executed by the one or more processors cause the one or more processors to perform operations comprising:
    detecting a raw input string for a category in a member profile maintained by an on-line network for a first member, the category having a plurality of predefined standardized values;
    executing a machine-learning classifier to select one of the predefined standardized values corresponding to the raw input string, the machine-learning classifier being obtained by training a machine-learning tool that estimates relationships among variables, the training using training data having raw strings and corresponding standardized values for the raw strings;
    displaying the selected standardized value to the first member;
    from the first member, receiving a correction for the selected standardized value, the correction including a corrected standardized value from the plurality of predefined standardized values;
    including into a correcting filter the received correction as a corrective rule that matches the raw input string for the category to the corrected standardized value for the category;
    receiving the raw input string from a second member of the on-line network;
    executing the machine-learning classifier based on the received raw input string from the second member;
    providing the received raw input string to the correcting filter to obtain, based on the raw input string and the corrective rule, the corrected standardized value corresponding to the raw input string, using at least one processor;
    determining that the standardized value that was derived by the executing of the machine-learning classifier is different from the corrected standardized value obtained by the correcting filter; and
    identifying a member profile of the second member as associated with the corrected standardized value in response to determining that the standardized value that was derived by the executing of the machine-learning classifier is different from the corrected standardized value obtained by the correcting filter.

11. The system of claim 10, wherein the corrective rule includes an identification of the member profile.

12. The system of claim 10, wherein the corrective rule references one or more professional attributes maintained by the on-line network.

13. The system of claim 10, comprising:
    determining that the corrected standardized value is the same as the standardized value obtained by the machine-learning classifier; and
    removing the corrective rule from a set of rules used by the correcting filter in response to the determining.

14. The system of claim 10, comprising:
    accessing corrective data; and
    generating the corrective rule based on the corrective data.

15. The system of claim 14, comprising:
adding the corrective data to the training data used for re-training of the machine-learning classifier.

16. The system of claim 10, comprising determining the corrected standardized value in response to a potential error indicator.

17. The system of claim 16, wherein the potential error indicator is an identification of the member profile.

18. A machine-readable non-transitory storage medium having instruction data executable by a machine to cause the machine to perform operations comprising:
detecting a raw input string for a category in a member profile maintained by an on-line network for a first member, the category having a plurality of predefined standardized values;
executing a machine-learning classifier to select one of the predefined standardized values corresponding to the raw input string, the machine-learning classifier being obtained by training a machine-learning tool that estimates relationships among variables, the training using training data having raw strings and corresponding standardized values for the raw strings;
displaying the selected standardized value to the first member;
from the first member, receiving a correction for the selected standardized value, the correction including a corrected standardized value from the plurality of predefined standardized values;
including into a correcting filter the received correction as a corrective rule that matches the raw input string for the category to the corrected standardized value for the category;
receiving the raw input string from a second member of the on-line network;
executing the machine-learning classifier based on the received raw input string from the second member;
providing the received raw input string to the correcting filter to obtain, based on the raw input string and the corrective rule, the corrected standardized value corresponding to the raw input string, using at least one processor;
determining that the standardized value that was derived by the executing of the machine-learning classifier is different from the corrected standardized value obtained by the correcting filter; and
identifying a member profile of the second member as associated with the corrected standardized value in response to determining that the standardized value that was derived by the executing of the machine-learning classifier is different from the corrected standardized value obtained by the correcting filter.

* * * * *